(12) United States Patent
Wright

(10) Patent No.: US 7,835,060 B2
(45) Date of Patent: Nov. 16, 2010

(54) VARIABLE ATTENUATED TRANSMITTANCE DEVICE CONTROL SYSTEM

(75) Inventor: Aaron Wright, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/413,662

(22) Filed: Mar. 30, 2009

(65) Prior Publication Data

US 2010/0245972 A1    Sep. 30, 2010

(51) Int. Cl.
*G02F 1/153* (2006.01)
(52) U.S. Cl. .................................. 359/275; 359/900
(58) Field of Classification Search ................. 359/275, 359/265, 296, 900
See application file for complete search history.

(56) References Cited

U.S. PATENT DOCUMENTS

| | | |
|---|---|---|
| RE34,469 E | 12/1993 | Cogan et al. |
| 5,408,353 A | 4/1995 | Nichols et al. |
| 5,903,247 A | 5/1999 | Howard et al. |
| 6,094,292 A | 7/2000 | Goldner et al. |
| 6,211,993 B1 | 4/2001 | Wang et al. |
| 6,643,050 B2 | 11/2003 | Rukavina et al. |
| 6,972,888 B2 * | 12/2005 | Poll et al. .................... 359/265 |

* cited by examiner

*Primary Examiner*—Jack Dinh
(74) *Attorney, Agent, or Firm*—Mark E. Duell, Esq.; Emerson Thomson Bennett

(57) ABSTRACT

Some embodiments include an automotive variable attenuated transmittance device having a predetermined minimum transmittance. Such devices can include a suspended particle device, liquid crystal device, polymer dispersed liquid crystal device, or electrochromic device. Some embodiments also include a manual and/or automatic control system for varying transmittance according to any of a variety of data including, without limitation, position, orientation, transmitted power, and/or the position of an occupant's head.

1 Claim, 6 Drawing Sheets

VARIABLE ATTENUATED TRANSMITTANCE DEVICE CONTROL SYSTEM

I. BACKGROUND OF THE INVENTION

A. Field of Invention

This invention generally relates to devices capable of variably attenuating the transmission of electromagnetic radiation using manual and/or automated attenuation means.

B. Description of the Related Art

It is known in the automotive arts to use visible light filters to attenuate the level of light experienced by the occupant of a vehicle. For instance, it is known to incorporate a tinted strip in a top region of a windshield to lessen the glare from the sun. Additionally, it is known to apply tinted films to OEM windows aftermarket, or to incorporate tinted glass into an automobile. It is even known to use suspended particle, electrochromic or similar light attenuation devices to reduce the transmittance of a window.

Electrochromic devices operate by applying a voltage to an electrochromic material, which generally causes an electron transfer to or from a color center. The electron transfer causes the color center to either absorb visible light, thereby resulting in a colored material, or to reduce or eliminate visible absorption, thereby resulting in a colorless, i.e. bleached, state. Generally, a voltage is applied only long enough to cause the absorption or bleaching electron transition. The power can then be turned off and the colored or bleached state remains in a more or less stable condition.

In contrast, one problem that suspended particle devices have is that power must be maintained in order for the device to remain transmissive. When the power is lost, the suspended particles randomize and result in an opaque or translucent material. Therefore, in a de-energized state light attenuation exceeds that which is safe and/or required by government regulation. In fact, if power to the device were lost during operation of the vehicle the operator's vision could be completely obscured, creating a potentially deadly situation. For this reason, electrochromic devices have been preferred over suspended particle or liquid crystal devices.

Some embodiments of the present invention provide an automotive variable attenuated transmission device with a minimum transmittance that meets governmental safety requirements. Furthermore, some embodiments provide a system for manual and/or automatic control of such devices.

II. SUMMARY OF THE INVENTION

Some embodiments of the present invention relate to an automotive variable attenuated transmittance device, comprising: at least one device selected from one or more of suspended particle devices, liquid crystal devices, polymer dispersed liquid crystal devices, or electrochromic devices, the device having a predetermined minimum transmittance; and a means for manually and/or automatically adjusting transmittance of the device. Furthermore, in some embodiments the at least one device comprises: a plurality of suspended particle device elements each having a predetermined minimum transmittance from about 10% to about 100% under no-power conditions. In some embodiments the means for adjusting comprises: a manual transmittance control in electronic controlling communication with the plurality of suspended particle device elements; and an automatic transmittance control in electronic controlling communication with each suspended particle device element, the automatic control being adapted to maintain a relative inter-element transmittance distribution according to the position of each suspended particle device element relative to a light source.

Some embodiments include an automatic transmittance control in electronic controlling communication with each suspended particle device element and adapted to control transmittance of each element according to the intensity of light transmitting through each element.

Some embodiments relate to an automatic transmittance control adapted to define an adjustable transmittance gradient that automatically changes according to the position of an occupant's head relative to an external light source, the transmittance gradient being positioned to selectively shield the occupant's head from transmitted visible radiation.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
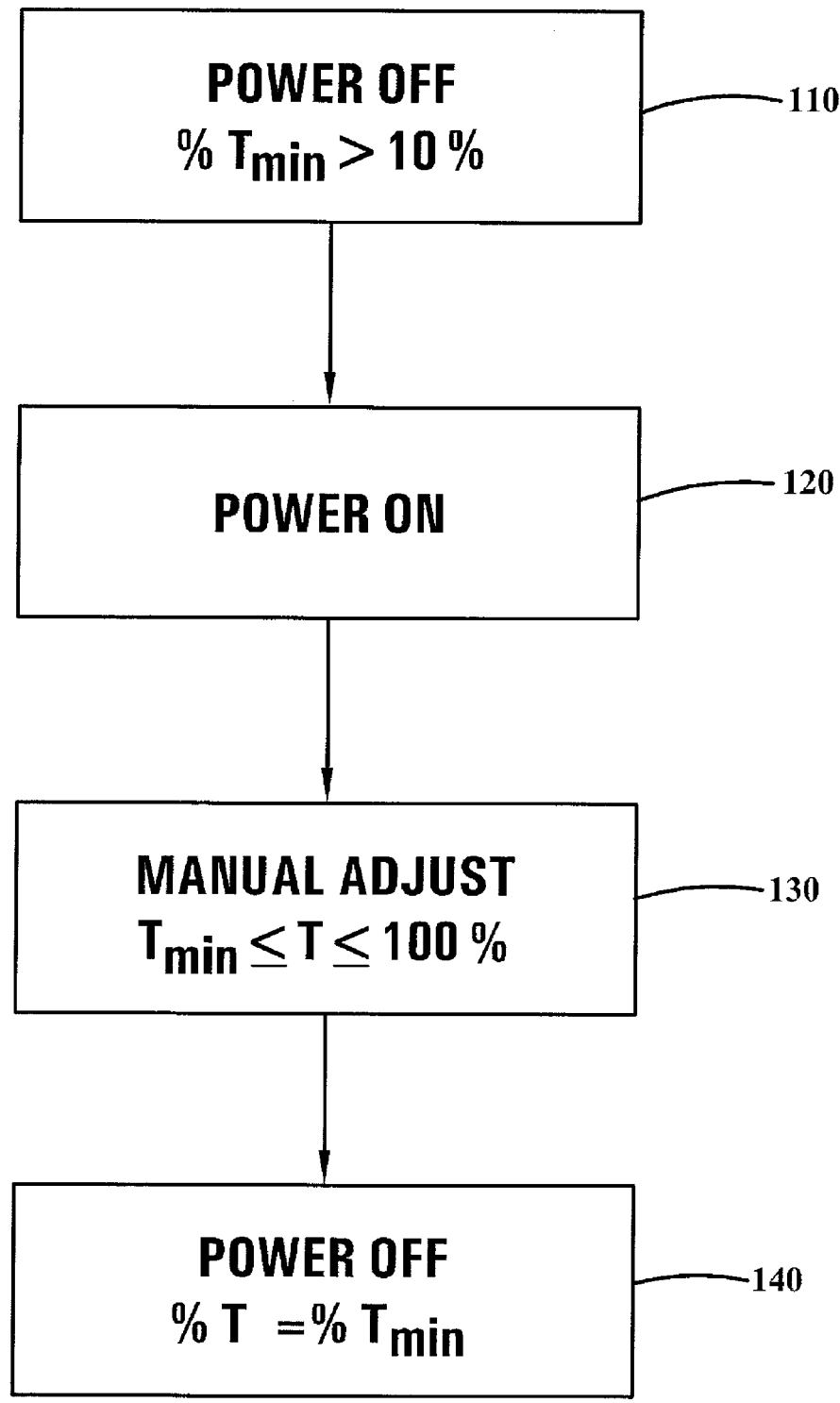
FIG. 1 is a flowchart showing a manual adjustment process embodiment.

The present invention generally relates to variable attenuated transmission devices and related methods. As used herein, the term variable attenuated transmission device includes devices that have an adjustable transmittance of electromagnetic radiation, such as visible light. Such devices can include, without limitation, suspended particle devices (SPDs), liquid crystal devices (LCDs), polymer dispersed liquid crystal devices, and/or electrochromic devices.

Some embodiments include a one or more SPDs each having a predetermined minimum visible-spectrum transmittance in a de-energized state. Furthermore, the SPDs or similar devices can be in electronic controlling communication with a controller. The controller can be adapted to control the transmittance of the SPDs according to one or more of a variety of inputs. For example, some embodiments can be manually controlled with a manually operated rheostat. In other embodiments, the SPDs can be automatically controlled according to, for instance, a predetermined program, photosensor feedback, GPS coordinates, compass data, gyroscopic data, accelerometer data, occupant head position, or any combination thereof.

According to one embodiment, a minimum transmittance can be attained by fabricating an SPD with a particle density sufficient to produce the desired transmittance under de-energized conditions. In one embodiment, the desired transmittance comports with minimum visibility requirements as determined by a government regulator. For example, in a de-energized state some embodiments can have an average transmittance across the visible spectrum from about 100% to less than 10%. More specifically, some embodiments have an average transmittance in a de-energized state from about 100% to about 90%, about 90% to about 80%, about 80% to about 70%, about 70% to about 60%, about 60% to about 50%, about 50% to about 40%, about 40% to about 30%, about 30% to about 20%, about 20% to about 10%, or even less than 10%. Here as elsewhere in the specification and claims, ranges may be combined.

In one embodiment, an SPD control system can include a manual transmittance adjustment. For instance, a manually adjustable rheostat may be in electrical communication with one or more SPDs, and may be adapted to provide a selected voltage thereto. Accordingly, if an occupant desires less transmittance the voltage may be decreased, and if he desires more transmittance the voltage may be increased.

According to an embodiment, a system for controlling a configuration of SPDs comprises sensing the position and orientation of each SPD relative to a light source such as the sun. Means for sensing position and orientation include one or more of a compass, gyroscope, accelerometer, GPS or similar devices. Alternatively, a plurality of GPS sensors could be incorporated into a configuration of SPDs. One of skill in the art will be able to select an appropriate means and precisely determine the relative position and orientation of each SPD. Therefore, it is possible to know each SPDs' orientation relative to the sun and to the other SPDs, and therefore whether more or less transmittance is necessary to maintain a predetermined transmitted power.

In one embodiment, the transmittance of the SPDs can be controlled as follows. The SPD most directly facing the sun is assigned a transmittance T and an orientation weighting factor $\alpha_n=1$. Each of the other SPDs is assigned a transmittance equal to T divided by a weighting factor $\alpha_n<1$. A human operator can manually adjust T so that the overall light influx is appropriate. The weighting factor $\alpha_n$ is a function of the relative position of the SPD according to GPS data. Thus, the SPD receiving the most direct sunlight is assigned lowest transmittance, i.e. where $\alpha_n=1$. Accordingly, SPDs receiving the most direct sunlight would have a lower transmittance, and those receiving little sunlight would have a higher transmittance. To illustrate, a four SPD configuration could be controlled as follows:

$T_1=T_n/\alpha_1$ $T_2=T_n/\alpha_2$ $T_3=T_n/\alpha_3$ $T_4=T_n/\alpha_4$

According to this set of equations, $T_n$ is the minimum transmittance and can be equal to any one of $T_1$, $T_2$, $T_3$, or $T_4$, depending on which SPD requires the lowest transmittance.

In another embodiment, a system for controlling a plurality of SPDs comprises sensing the power of light transmitted by each SPD independently. According to such embodiments the transmittance of each SPD automatically readjusts so as to maintain a predetermined transmission power. For example, an occupant can select a transmittance that yields a desirable transmitted light power. A light sensor monitors the power of transmitted light and communicates power data to a controller, which increase or decrease transmittance so as to maintain a constant power.

In still another embodiment, an occupant can select a desired diffuse light power, and the SPDs can each adjust so as to maintain the selected power. The diffuse light power results from the sum of all light transmitted through each of the SPDs into a volume, such as an automobile interior, which is diffusely reflected about the cabin. This is in contrast to the prior embodiment, which measures non-diffuse light transmitted by a single SPD. According to one embodiment, the diffuse light power can be measured using a photodiode positioned in a central location, and optionally enclosed in a light diffusing housing, such as frosted glass. An occupant would set a light level, and a controller would then attain and/or maintain the light level set point by adjusting the transmittance of one or more SPDs as a function of feedback data from the diffuse light sensor.

In still another embodiment, a system for controlling a plurality of SPDs comprises sensing the position of an occupant's head and adjusting the transmittance of SPDs so as to maintain a selected light level impinging upon the occupant. In some embodiments, the SPD can even be adapted to generate a transmittance gradient. Accordingly, the portion of an SPD transmitting light to an occupant's head can have a lower transmittance than other areas of the SPD. Some embodiments can comprise a combination of one or more of any of the foregoing embodiments.

Referring now to the drawings wherein the showings are for purposes of illustrating embodiments of the invention only and not for purposes of limiting the same, FIG. 1 is a flowchart showing a process embodiment. The power is first in an off state 110, and the transmittance is shown to be at a predetermined minimum $T_{min}$ greater than or equal to 10%. The power is then turned on 120, and the transmittance is adjusted manually 130 to a transmittance between $T_{min}$ and 100%. Finally, the power is again turned off 140 and the transmittance returns to $T_{min}$.

Figure 2A:
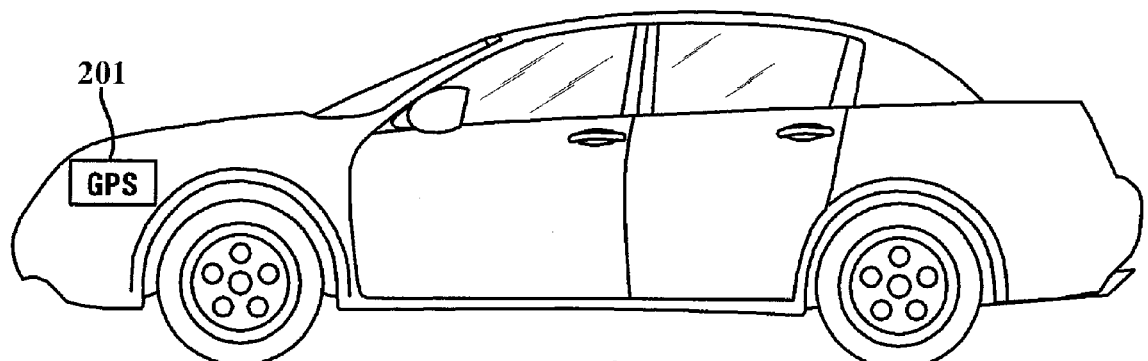
FIG. 2A is a side view drawing showing the placement of a navigation unit according to an embodiment.
Figure 2B:
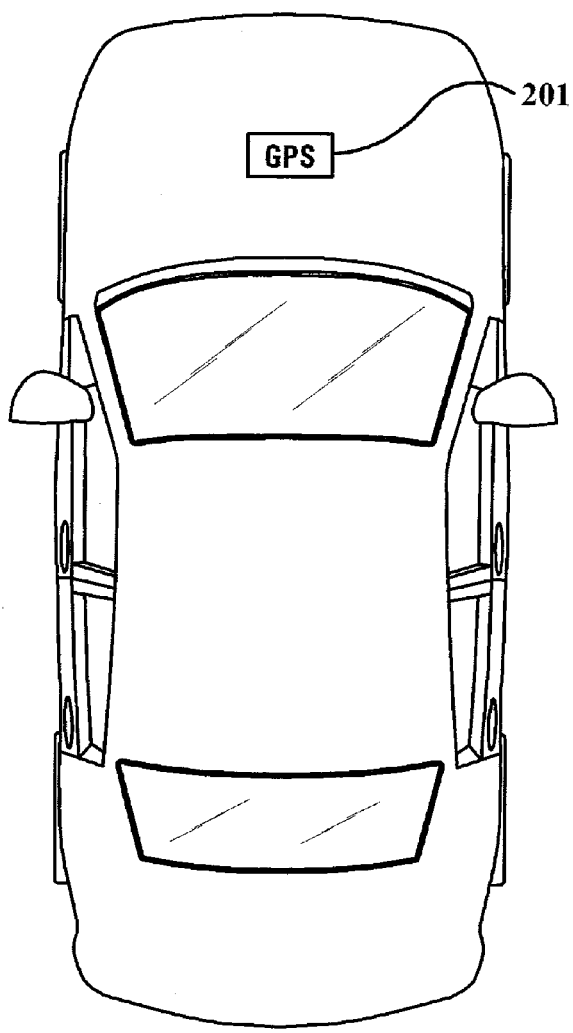
FIG. 2B is a top view drawing showing the placement of navigation unit according to an embodiment.

FIG. 2A is a generalized side view drawing of an automobile showing where a navigation unit 201 may be disposed for determining the position and orientation of the vehicle. FIG. 2B is a top view drawing of the same automobile. According to FIG. 2 A and B a combination GPS and compass unit 201 is located in a forward region of the automobile. One of skill in the art will recognize that alternative locations can be appropriate as well. By placing the navigation instruments at a well defined point within the vehicle, the vehicle's position and orientation can be determined. Further, in some embodiments one or more gyroscopes can be used to determine such things as pitch, roll, and/or yaw. Accordingly, the position and orientation of each part of the automobile, including that of the SPDs, can be accurately calculated. One of skill in the art will appreciate that embodiments are not limited to automobiles. Rather, embodiments can include architectural applications such as office buildings, residential construction or the like. Furthermore, embodiments can include any application where the electromagnetic radiation entering a space is to be controlled.

Figure 3:
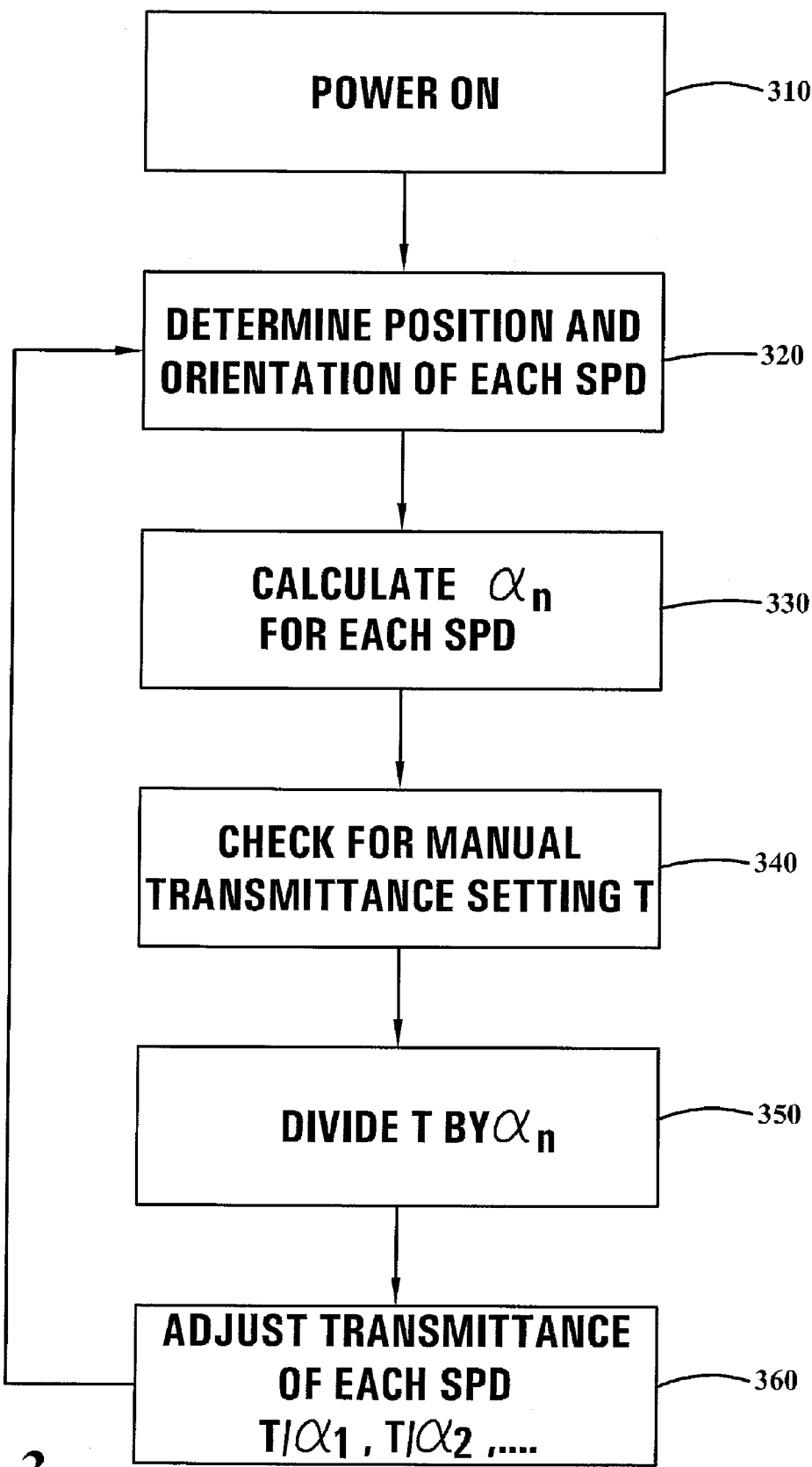
FIG. 3 is a flowchart showing a GPS enabled process embodiment.

FIG. 3 illustrates a process by which GPS data can be used to modulate the transmittance of an assembly of SPDs in, for instance, an automobile. First the power is turned on 310. One of skill in the art will appreciate that the next several steps may vary in order. A controller uses GPS data, compass, and/or gyroscopic data gathered from a navigation unit mounted to the automobile to calculate the position and orientation of each SPD installed in the vehicle 320. Presumably, the controller is pre-programmed with the position and orientation of each SPD relative to the navigation unit. Therefore, by knowing the coordinates of the navigation unit one may calculate the coordinates of the SPDs. The controller then calculates an orientation weighting factor an for each SPD 330. The controller then checks for a transmittance setting T 340, which may be manually preset and adjustable. The controller then divides T by each weighting factor $\alpha_n$ to determine the transmittance setting for each SPD 350. The controller then adjusts each SPD to its weighted transmittance. According to FIG. 3 the controller loops through this process and continuously recalculates $\alpha_n$ as the vehicle moves. Accordingly, the SPDs adjust to changing lighting conditions in real time or near real time.

Figure 4:
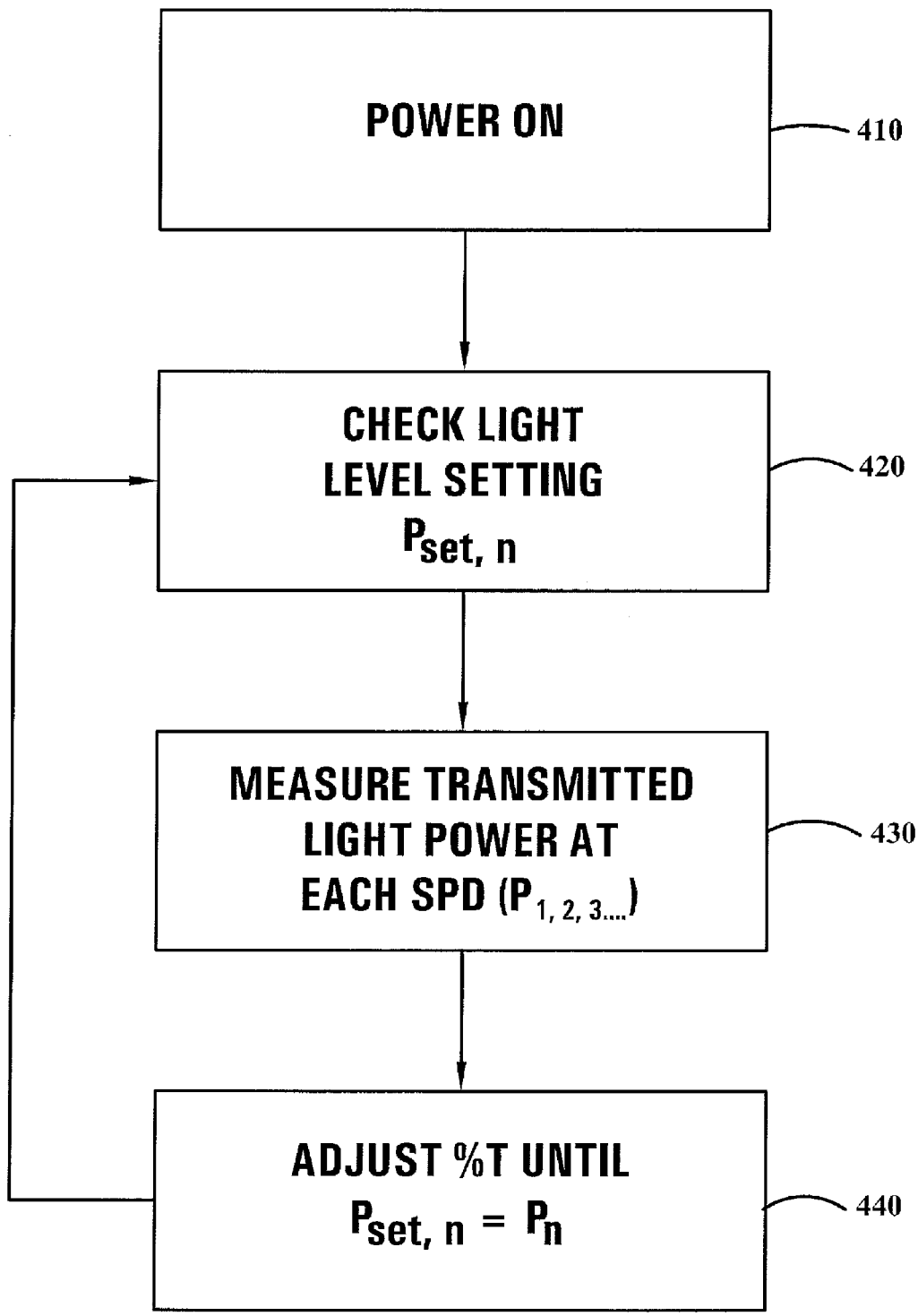
FIG. 4 is a flowchart showing a process embodiment including monitoring transmitted power.

FIG. 4 shows a process embodiment wherein the transmittance of SPDs is adjusted according to the light transmitted through the SPD as compared to a set value. According to this process the power is first turned on 410, and the controller checks for a light level setting $P_{set,\,n}$ for each SPD 420 (e.g. $P_{set,\,1}$, $P_{set,\,2}$, $P_{set,\,3}$, $P_{set,\,4}$ ... $P_{set,\,n}$). The setting may be provided by a manually adjustable control. The transmitted power is then measured for each SPD (e.g. $P_1$, $P_2$, $P_3$, $P_4$ ... $P_n$) 430. The controller then adjusts the transmittance of each SPD until $P_n = P_{set,n}$ 440. The process loops so as to continuously check for changes to the light level setting and/or changes in the transmitted power, which would result in adjusting the transmittance of an SPD.

Figure 5:
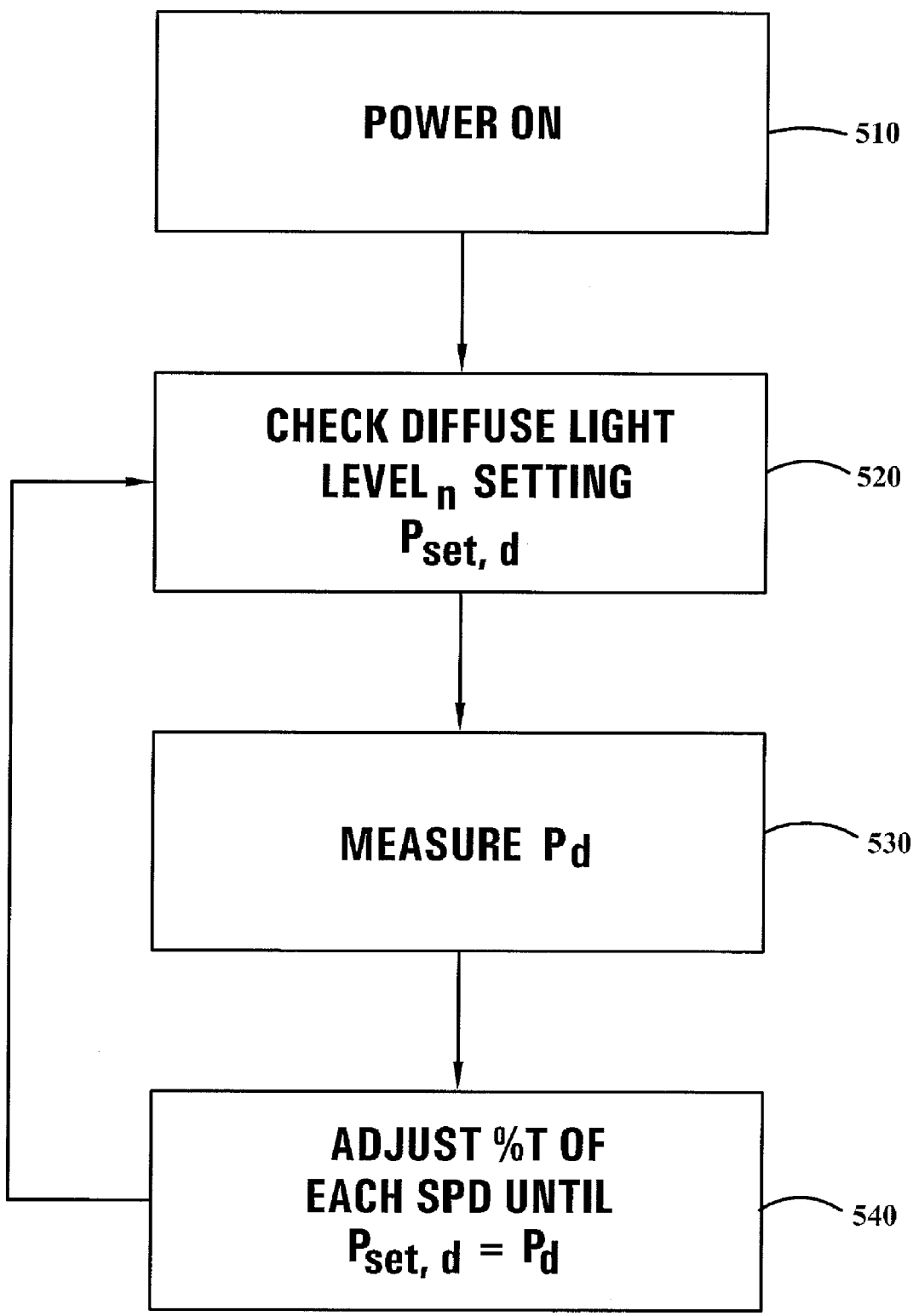
FIG. 5 is a flowchart showing a process embodiment including monitoring diffuse power.

FIG. 5 illustrates a process for adjusting the transmittance of each of the SPDs according to a diffuse light level sensed at a central location within, for instance, an automobile. According to this embodiment the power is first turned on 510, and the controller checks for a diffuse light level setting $P_{set,d}$, which may be set manually 520. The controller then checks the actual diffuse light level $P_d$ in the automobile 530. The controller then adjusts transmittance of one or more SPDs until actual diffuse light level $P_d$ is equal to the selected value $P_{set,d}$.

Figure 6:
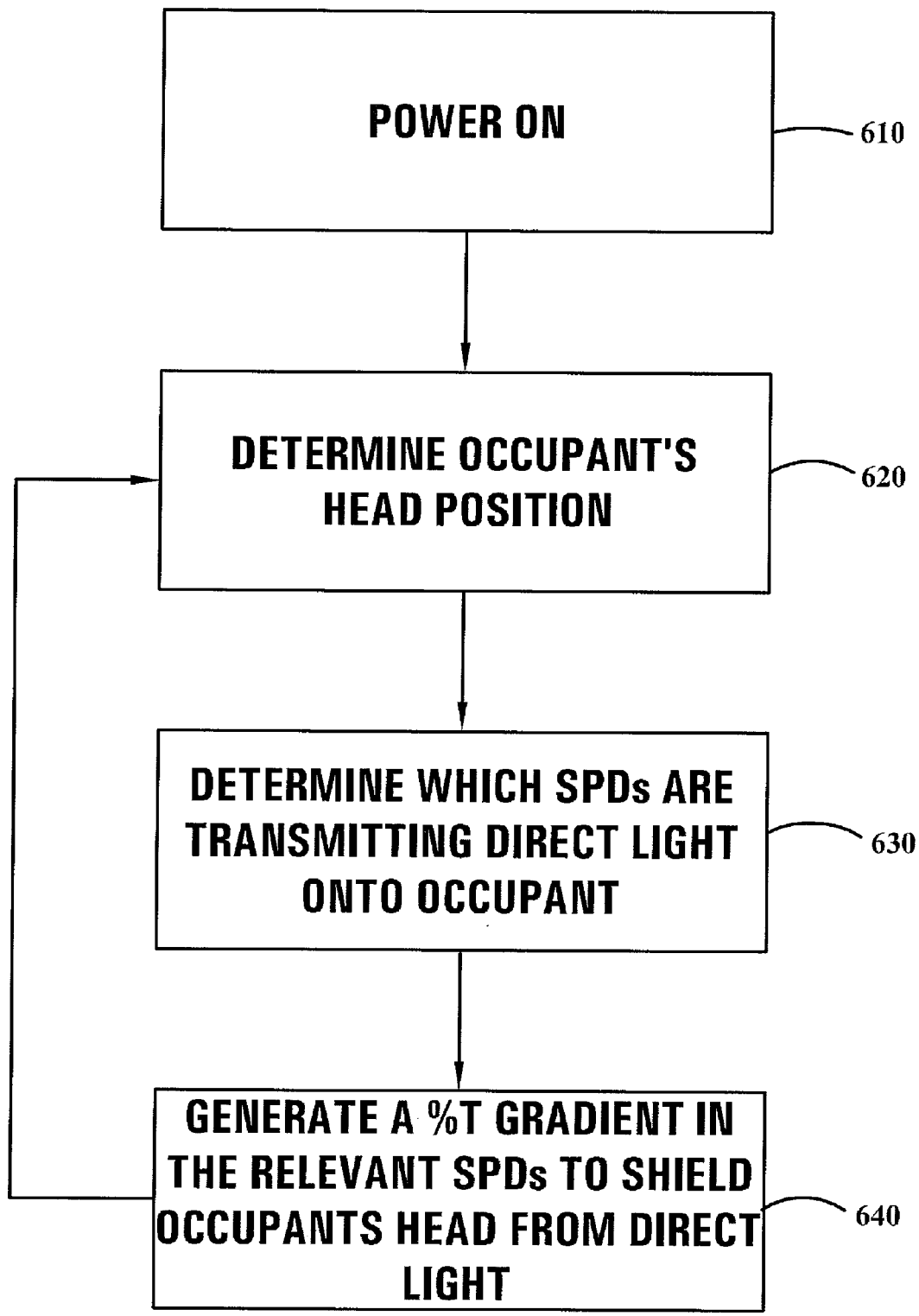
FIG. 6 is a flowchart showing a process embodiment including monitoring head position.

FIG. 6 is a flowchart illustrating a process embodiment whereby the transmittance of one or more SPDs, or portions thereof, may be adjusted to selectively shield an occupant from direct sunlight. According to this process, the power is first turned on 610, and the controller determines the position and orientation of the occupant's head 620. The controller then determines which SPDs, or portions thereof, are transmitting directly onto the occupant. The controller then generates a transmittance gradient within the appropriate SPDs so that the occupant is shielded from direct light. The process continuously loops back to correct for changes in head position and transmitted power. A similar embodiment replaces the SPDs with liquid crystal devices (LCDs) having addressable pixels. Accordingly, a transmittance gradient can be generated using known methods for controlling LCDs.

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof.

Having thus described the invention, it is now claimed:

1. A method for modulating the transmittance of an assembly of suspended particle devices, comprising the steps of:
   A) providing a vehicle having tires, wheels, a suspension, and a frame for supporting a vehicle body and automotive glass; at least four suspended particle automotive glass devices, mounted within the vehicle frame, and having a predetermined minimum transmittance from about 10% to about 100% under no-power conditions; an automatic transmittance controller, having a GPS navigation data source, in electronic controlling communication with each suspended particle device element; and a manual transmittance control, providing a selectively adjustable transmittance setting to the controller;
   B) providing power to the automatic transmittance controller and manual transmittance control;
   C) using the automatic transmittance controller to calculate the position of the suspended particle devices relative to the sun by comparing coordinates captured by the GPS navigation data source to pre-programmed coordinates of the suspended particle devices in relation to the GPS navigation data source;
   D) using the automatic transmittance controller to: a) reduce the transmittance of suspended particle devices facing the sun to levels consistent with a transmittance setting provided by the manual transmittance control, and b) provide a transmittance level to suspended particle devices not facing the sun that is greater than the suspended particle devices facing the sun;
   E) repeating steps C and D as long as power is provided to the automatic transmittance controller.

* * * * *